(12) United States Patent
Kawauchi (10) Patent No.: US 11,956,271 B2
(45) Date of Patent: Apr. 9, 2024

(54) SCENARIO GENERATION DEVICE, SCENARIO GENERATION METHOD, AND COMPUTER READABLE MEDIUM

(71) Applicant: MITSUBISHI ELECTRIC CORPORATION, Tokyo (JP)

(72) Inventor: Kiyoto Kawauchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 483 days.

(21) Appl. No.: 17/215,421

(22) Filed: Mar. 29, 2021

(65) Prior Publication Data
US 2021/0218769 A1    Jul. 15, 2021

Related U.S. Application Data (63) Continuation of application No. PCT/JP2018/043080, filed on Nov. 21, 2018.

(51) Int. Cl.
*H04L 9/40* (2022.01)
*H04L 43/00* (2022.01)

(52) U.S. Cl.
CPC .......... *H04L 63/1441* (2013.01); *H04L 43/14* (2013.01); *H04L 63/1416* (2013.01); *H04L 63/1433* (2013.01)

(58) Field of Classification Search
CPC ............. H04L 63/1441; H04L 63/1416; H04L 63/1433
See application file for complete search history.

(56) References Cited

U.S. PATENT DOCUMENTS

| 10,320,828 B1* | 6/2019 | Derbeko ............... G06F 21/577 |
| 2005/0241000 A1 | 10/2005 | Kawauchi |
| 2012/0233699 A1* | 9/2012 | Jajodia ................ H04L 63/1433 726/25 |

(Continued)

FOREIGN PATENT DOCUMENTS

| JP | 2004-145413 A | 5/2004 |
| JP | 2011-86201 A | 4/2011 |

(Continued)

OTHER PUBLICATIONS

International Search Report, issued in PCT/JP2018/043080, PCT/ISA/210, dated Feb. 26, 2019.

(Continued)

*Primary Examiner* — Thaddeus J Plecha
(74) *Attorney, Agent, or Firm* — Birch, Stewart, Kolasch & Birch, LLP (57) ABSTRACT

A scenario generation device (100) generates an attack scenario (32). An attack means storage unit (130) has stored therein attack means data (131) including a precondition and an attack effect of attack means. An edit screen display unit (110) arranges attack means to be included in the attack scenario (32) on a scenario edit screen (200). By using the attack means data (131), an attack scenario generation unit (20) extracts, from the attack means storage unit (130), another attack means whose attack effect is a precondition of attack means arranged on the scenario edit screen (200). The attack scenario generation unit (20) generates the attack scenario (32) by complementing the attack means arranged on the scenario edit screen (200) with the other attack means.

10 Claims, 10 Drawing Sheets

(56) References Cited

U.S. PATENT DOCUMENTS

2014/0046645 A1* 2/2014 White ................. H04L 63/1433
703/13
2017/0244745 A1* 8/2017 Key .................... H04L 63/1425
2018/0309780 A1* 10/2018 Damodaran .......... H04L 41/145

FOREIGN PATENT DOCUMENTS

JP 2017-198836 A 11/2017
WO WO 2017/126041 A1 7/2017

OTHER PUBLICATIONS

Kawauchi et al., "A Vulnerability Assessment Tool Using First-Order Predicate Logic", IPSJ SIG Technical Report, vol. 2002, No. 122, (CSEC-19), p. 43-48.

* cited by examiner

30 : OPERATOR

31 : SCENARIO GENERATION INSTRUCTION

131 : ATTACK MEANS DATA

```
<?xml version="1.0" encoding="Shift_JIS"?>
                                                              501
<scenario-part name="Information leak: file leak by RAT communication">
```

502 PRECONDITION
```
<precondition>
                    514
    <predicate name="RAT">                    506
        <var name="RAT_HOST"/>    511
        <string>admin</string>
                                  515
        <var name="SESSION_ID"/>
    </predicate>

<predicate name="hasSecrets">    507
        <var name="FILE_PATH"/>
        <var name="RAT_HOST"/>
    </predicate>
</precondition>
```

503 PARAMETER DEFINITION PART
```
<parameters>      512      513
    <parameter name="FILE_PATH">C:\tmp\secrets.rar</parameter>
</parameters>
```

504 ATTACK EFFECT
```
<effect>
    <predicate name="exfilt">    508
        <var name="FILE_PATH"/>
        <var name="RAT_HOST"/>
    </predicate>
</effect>
```

505 ATTACK SCRIPT DEFINITION
```
<action>
background           509
sessions -i %{SESSION_ID}
download %{FILE_PATH}
</action>              510
```

```
</scenario-part>
```

Fig. 6

141 : EXERCISE ENVIRONMENT DATA

```
<predicate name="SERVER">
    <string>FILE</string>
    <string>10.74.3.19</string>
</predicate>
```
602

```
<predicate name="SERVER">
    <string>AD</string>
    <string>10.74.3.14</string>
</predicate>
<predicate name="SHARE">
    <string>10.74.3.19</string>
    <string>kyoyu</string>
</predicate>
<predicate name="MAC">
    <string>ROUTER</string>
    <string>xx:bb:cc:dd:ee:ff</string>
</predicate>
...
```

Fig. 7

35 : ATTACK SCRIPT

```
background
sessions -i 1
download C:\tmp\secrets.rar
...
```

SCENARIO GENERATION DEVICE, SCENARIO GENERATION METHOD, AND COMPUTER READABLE MEDIUM

CROSS REFERENCE TO RELATED APPLICATIONS

This application is a Continuation of PCT International Application No. PCT/JP2018/043080 filed on Nov. 21, 2018, which is hereby expressly incorporated by reference into the present application.

TECHNICAL FIELD

The present invention relates to scenario generation devices, scenario generation methods, and scenario generation programs.

BACKGROUND ART

Patent Literature 1 and Non-Patent Literature 1 each describe a simulated attack system which generates, as an attack scenario, an execution string of a series of attack means to achieve an attack effect demanded by a user. Specifically, the attack effect is an effect such as transmission of a classified file to outside. In this simulated attack system, an attack scenario is generated by defining a precondition of execution and an attack effect acquired by execution for attack means with componentized attack activities of a cyber attack.

CITATION LIST

Patent Literature

Patent Literature 1: JP 2004-145413 A

Non-Patent Literature

Non-Patent Literature 1: Kiyoto Kawauchi, Shigeki Kitazawa, Hatsumi Nakano, Takehiro Ohkoshi, Seiji Fujii, and Motokazu Kawaki, "A Vulnerability Assessment Tool Using First-Order Predicate Logic", IPSJ SIG Technical Report, volume 2002: 122 (CSEC-19), pp. 43-48

SUMMARY OF INVENTION

Technical Problem

According to the technique of Patent Literature 1 or Non-Patent Literature 1, when an attack exercise is performed, the teacher indicates only an attack goal, and an attack scenario to achieve that goal is automatically generated. However, an attack activity in the middle cannot be specified. Thus, it is impossible to specify part of an attack scenario such as "enter a terminal A via a USB memory to spread infection to a terminal X by password full search and finally transmit a file of a server Y to outside" and generate an attack scenario including the specified attack activity. Also, even if a specified attack activity is included in the attack scenario, there is a possibility that that attack activity is not a meaningful attack activity in the attack scenario. Here, the "meaningful attack activity" means that if that attack activity is removed from the scenario, at least one or more attack activities in the subsequent stages cannot be executed.

An object of the present invention is to automatically generate an attack scenario only by a teacher specifying part of attack activities in an attack scenario serving as an exercise point, the attack scenario including all of these attack activities, with these attack activities serving as meaningful attack activities in the attack scenario.

Solution to Problem

A scenario generation device which generates an attack scenario for use in a cyber attack exercise, according to the present invention, includes:
  an attack means storage unit to store attack means data indicating attack means with componentized attack activities of a cyber attack, the attack means data including a precondition and an attack effect of the attack means;
  an edit screen display unit to arrange attack means to be included in the attack scenario on a scenario edit screen; and
  an attack scenario generation unit to extract, by using the attack means data stored in the attack means storage unit, another attack means whose attack effect is a precondition of attack means arranged on the scenario edit screen from the attack means storage unit and to generate the attack scenario by complementing the attack means arranged on the scenario edit screen with the other attack means.

Advantageous Effects of Invention

In the scenario generation device according to the present invention, the edit screen generation unit arranges, on the scenario edit screen, attack means to be included in the attack scenario. By using the attack means data stored in the attack means storage unit, the attack scenario generation unit extracts, from the attack means storage unit, another attack means whose attack effect is a precondition of attack means arranged on the scenario edit screen. Then, the attack scenario generation unit generates the attack scenario by complementing the attack means arranged on the scenario edit screen with the other attack means. Thus, according to the scenario generation device of the present invention, by arranging the attack means to be included in the attack scenario, it is possible to generate an attack scenario including all of these attack means, with these attack means serving as meaningful attack activities in the attack scenario.

DESCRIPTION OF EMBODIMENTS

In the following, an embodiment of the present invention is described by using the drawings. In each of the drawings, identical or corresponding portions are provided with the same reference numeral. In the description of the embodiment, description of identical or corresponding portions are omitted or simplified as appropriate.

Embodiment 1

\*\*\*Description of Structure\*\*\*

Figure 1:
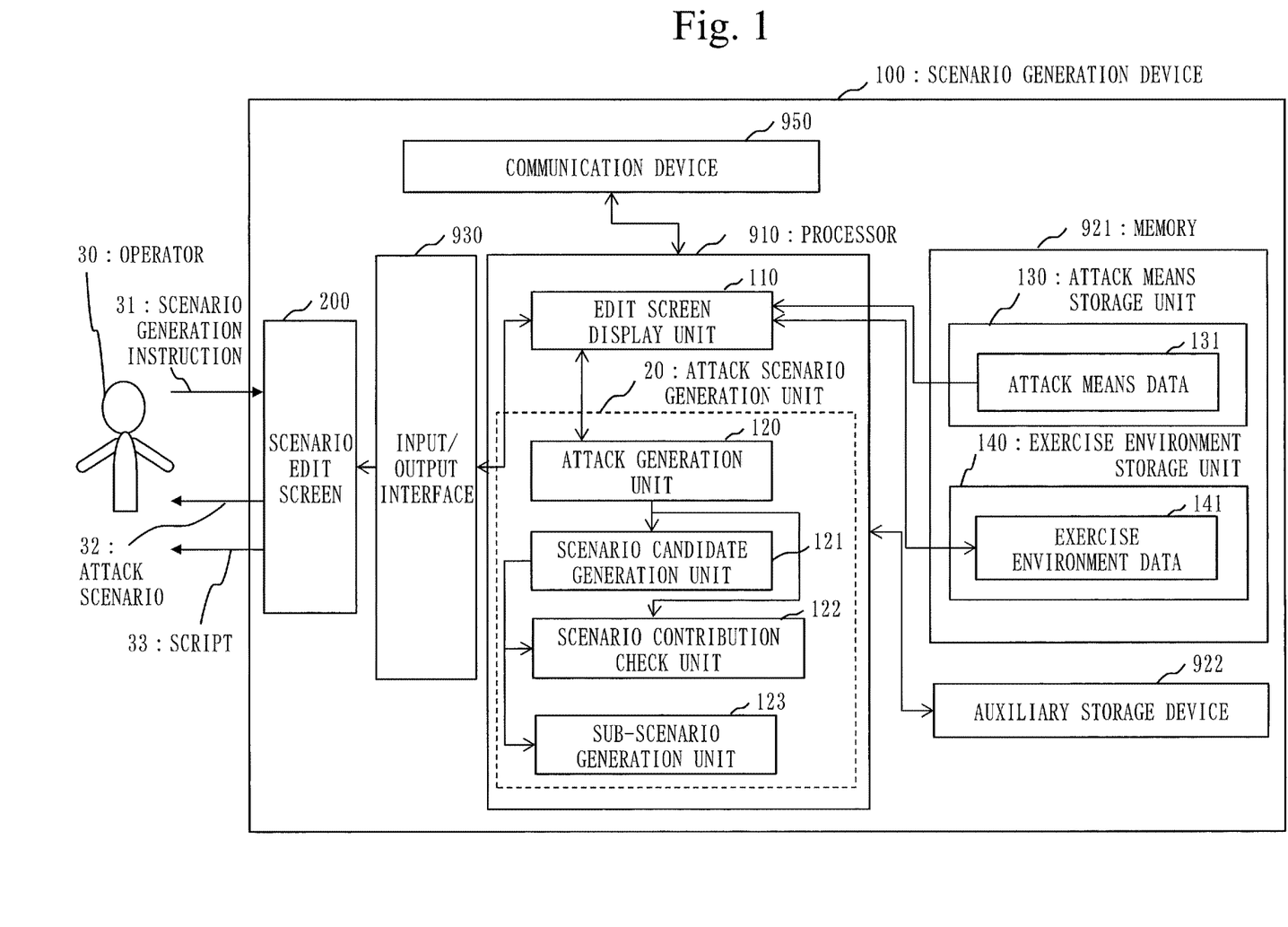
FIG. 1 is a diagram of the structure of a scenario generation device according to Embodiment 1.

The structure of a scenario generation device 100 according to the present embodiment is described by using FIG. 1.

The scenario generation device 100 is a computer. The scenario generation device 100 includes a processor 910 and also includes other pieces of hardware such as a memory 921, an auxiliary storage device 922, an input/output interface 930, and a communication device 950. The processor 910 is connected to other pieces of hardware via signal lines to control these pieces of hardware.

The scenario generation device 100 includes an edit screen display unit 110, an attack scenario generation unit 20, an attack means storage unit 130, and an exercise environment storage unit 140 as functional components. The attack scenario generation unit 20 includes an attack generation unit 120, a scenario candidate generation unit 121, a scenario contribution check unit 122, and a sub-scenario generation unit 123. The attack means storage unit 130 has attack means data 131 stored therein. The exercise environment storage unit 140 has exercise environment data 141 stored therein.

The functions of the edit screen display unit 110, the attack generation unit 120, the scenario candidate generation unit 121, the scenario contribution check unit 122, and the sub-scenario generation unit 123 are implemented by software. The attack means storage unit 130 and the exercise environment storage unit 140 are included in a memory 921.

The processor 910 is a device which performs a scenario generation program. The scenario generation program is a program which implements the functions of the edit screen display unit 110, the attack generation unit 120, the scenario candidate generation unit 121, the scenario contribution check unit 122, and the sub-scenario generation unit 123.

The processor 910 is an IC (Integrated Circuit) which performs arithmetic processing. Specific examples of the processor 910 include a CPU (Central Processing Unit), a DSP (Digital Signal Processor), and a GPU (Graphics Processing Unit).

The memory 921 is a storage device which temporarily stores data. Specific examples of the memory 921 include an SRAM (Static Random Access Memory) or a DRAM (Dynamic Random Access Memory).

The auxiliary storage device 922 is a storage device which retains data. A specific example of the auxiliary storage device 922 is an HDD. Also, the auxiliary storage device 922 may be a portable storage medium such as an SD (registered trademark) memory card, CF, NAND flash memory, flexible disc, optical disc, compact disc, Blu-ray (registered trademark) disc, or DVD. HDD is an abbreviation of Hard Disk Drive. SD (registered trademark) is an abbreviation of Secure Digital. CF is an abbreviation of CompactFlash (registered trademark). DVD is an abbreviation of Digital Versatile Disk.

The input/output interface 930 is a port to be connected to input/output devices such as a mouse, a keyboard, a touch panel, and a display. The display is, specifically, an LCD (Liquid Crystal Display). The input/output interface 930 is, specifically, a USB (Universal Serial Bus) terminal or HDMI (registered trademark) (High Definition Multimedia Interface) terminal. The input/output interface 930 may be a port to be connected to a LAN (Local Area Network).

In the present embodiment, the edit screen display unit 110 is connected via the input/output interface 930 to a scenario edit screen 200. The edit screen display unit 110 acquires information from the scenario edit screen 200 via the input/output interface 930. The edit screen display unit 110 outputs information via the input/output interface 930 to the scenario edit screen 200.

The communication device 950 has a receiver and a transmitter. The communication device 950 is connected to a communication network such as a LAN, the Internet, or a telephone line. The communication device 950 is, specifically, a communication chip or NIC (Network Interface Card). The scenario generation device 100 may be connected via the communication device 950 to the scenario edit screen 200.

The scenario generation program is read into the processor 910 and is executed by the processor 910. The memory 921 has stored therein not only the scenario generation program but also an OS (Operating System). While executing the OS, the processor 910 executes the scenario generation program. The scenario generation program and the OS may be stored in the auxiliary storage device 922. The scenario generation program and the OS stored in the auxiliary storage device 922 is loaded to the memory 921 and is executed by the processor 910. The scenario generation program may be partially or entirely incorporated in the OS.

The scenario generation device 100 may include a plurality of processors which replace the processor 910. The plurality of these processors share execution of the scenario generation program. As with the processor 910, each of these processors is a device which executes the scenario generation program.

Data, information, signal values, and variable values to be used, processed, or outputted by or from the scenario generation program are stored in a register or cache memory in the memory 921, the auxiliary storage device 922, or the processor 910.

The "units" of the edit screen display unit 110 and the attack scenario generation unit 20 may be each read as a "process", "procedure", or "step". Also, the "processes" of an edit screen display process and an attack scenario generation process may be each read as a "program", "program product", or "computer-readable storage medium having a program recorded therein".

The scenario generation program causes the computer to perform each process, each procedure, or each step acquired by reading each of the above-described "units" as a "process", "procedure", or "step". Also, a scenario generation method is a method to be performed by the scenario generation device 100 executing the scenario generation program.

The scenario generation program may be provided as being stored in a computer-readable medium, recording medium, or storage medium. Also, the scenario generation program may be provided as a program product.

*General Description of Functions*

The scenario generation device 100 generates an attack scenario 32 for use in a cyber attack exercise.

The edit screen display unit 110 arranges, on the scenario edit screen 200, attack means to be included in an attack scenario 32. Also, the edit screen display unit 110 edits and causes the attack scenario to be displayed via the scenario edit screen 200. The edit screen display unit 110 accepts, via the scenario edit screen 200, a scenario generation instruction 31 from an operator 30. The operator 30 is an administrator such as a teacher when an attack exercise is performed. Also, the edit screen display unit 110 causes the attack scenario 32 and an attack script 33 to be displayed via the scenario edit screen 200.

By using the attack means data 131 stored in the attack means storage unit 130, the attack scenario generation unit 20 extracts, from the attack means storage unit 130, another attack means whose attack effect is a precondition of attack means arranged on the scenario edit screen 200. Then, the attack scenario generation unit 20 generates the attack scenario 32 by complementing the attack means arranged on the scenario edit screen 200 with the other attack means.

When the attack scenario 32 is generated, the attack generation unit 120 reads the scenario candidate generation unit 121 and the scenario contribution check unit 122. The scenario candidate generation unit 121 generates an attack scenario candidate. When generating an attack scenario candidate, the scenario candidate generation unit 121 recursively reads the scenario candidate generation unit 121 and also reads the sub-scenario generation unit 123. The scenario contribution check unit 122 checks an attack scenario candidate.

The attack means storage unit 130 has stored therein the attack means data 131 indicating attack means acquired by componentizing attack activities of cyber attacks, the attack means data 131 including preconditions and attack effects of the attack means. The attack means storage unit 130 accumulates one or more pieces of attack means data 131. The attack means data 131 is acquired by componentizing attack activities performed by an attacker. The attack scenario 32 is represented as data with the attack means data 131 placed along a time series.

The exercise environment storage unit 140 accumulates one or more pieces of exercise environment data 141. The exercise environment data 141 is data indicating configuration information of a system as an attack target. For example, the exercise environment data 141 includes information, for example, the IP address of a file server or a file path of a file stored in the file server.

Figure 2:
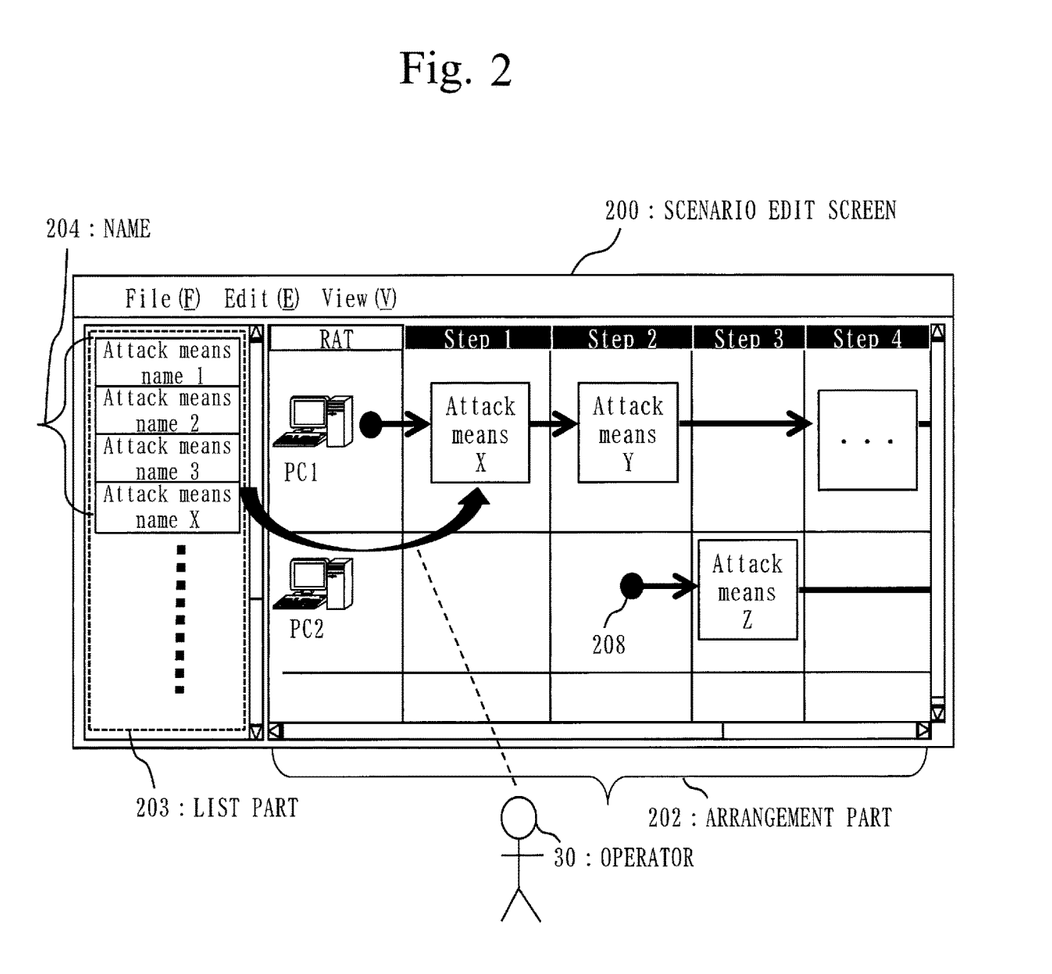
FIG. 2 is a diagram of the structure of a scenario edit screen according to Embodiment 1.

FIG. 2 is a diagram illustrating the structure of the scenario edit screen 200 according to the present embodiment.

The scenario edit screen 200 includes a list part 203 and an arrangement part 202.

On the list part 203, names 204 of the attack means data 131 stored in the attack means storage unit 130 are displayed as a list. The list part 203 is also referred to as an attack means list display pane.

The arrangement part 202 is divided into a lattice shape. Each row of the arrangement part 202 is associated with each PC (personal computer) serving as an exercise environment for the attack scenario. In FIG. 2, each row of the arrangement part 202 is associated with a PC such as PC1 or PC2. On each row of the arrangement part 202, the attack means to be executed on each PC are arranged in a time-series order. The operator 30 selects, from the list part 203, attack means desired to be executed in the attack scenario, and arranges the selected attack means on the arrangement part 202 by a drag-and-drop. In FIG. 2, attack means X, Y, and Z are arranged in a time-series manner. The arranged attack means are automatically coupled by an arrow. A black circle 208 indicates that infection spreads over PC2 by the attack means Y on the row above. The arrangement part 202 is also referred to as an attack means arrangement pane.

Figure 3:
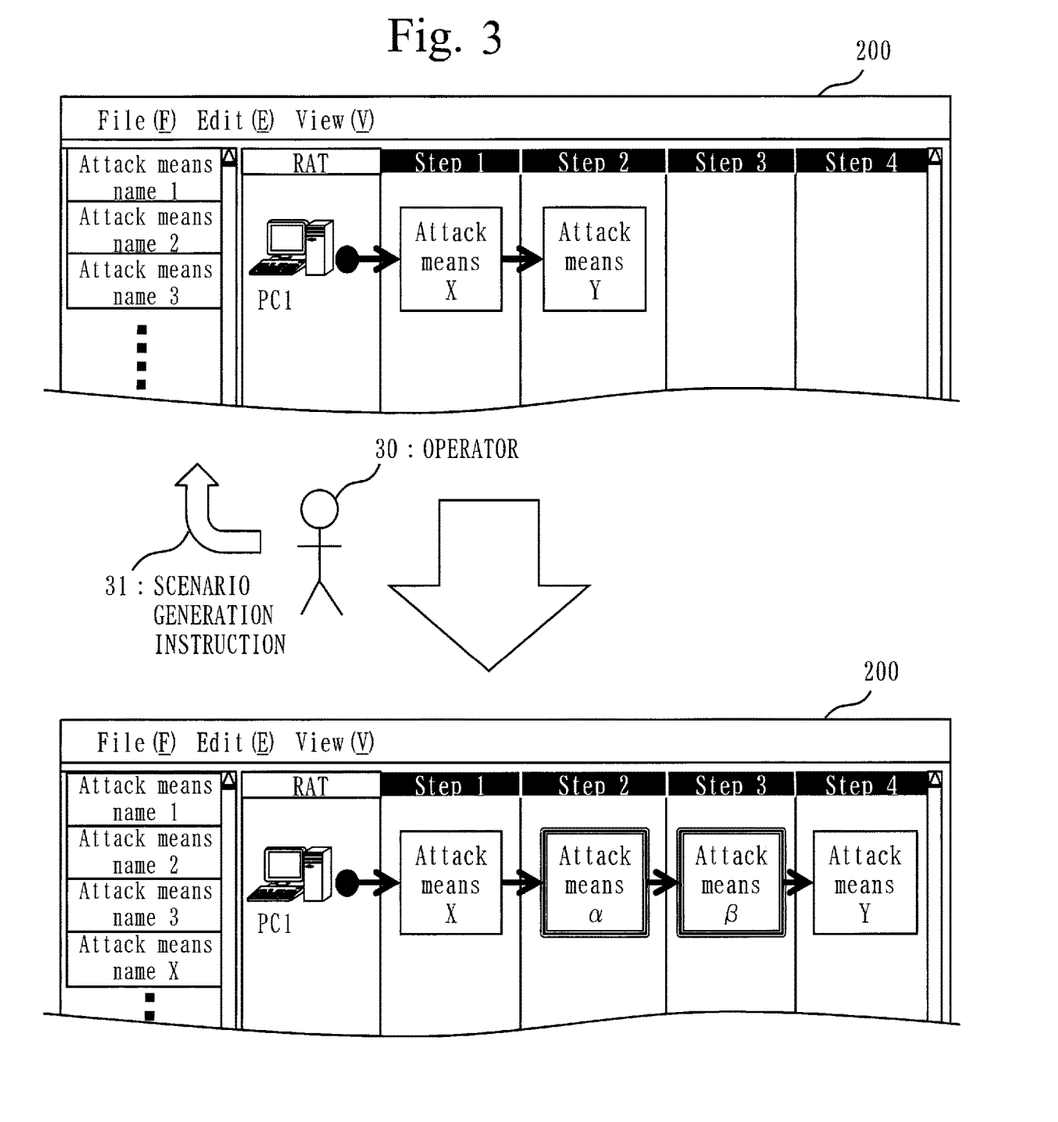
FIG. 3 is a diagram for describing one example of features of the scenario generation device according to Embodiment 1.

FIG. 3 is a diagram for describing one example of features of the scenario generation device 100 according to the present embodiment. In FIG. 3, description is made to how complementation of the attack scenario by the scenario generation device 100 is represented on the scenario edit screen 200.

The operator 30 arranges the attack means X and Y desired to be executed. That is, the edit screen display unit 110 arranges, on the scenario edit screen 200, the plurality of attack means X and Y to be included in the attack scenario 32 in a time-series manner. Then, by the operator 30, the scenario generation instruction 31 is inputted to the scenario generation device 100. The operator 30 inputs the scenario generation instruction 31 to the scenario generation device 100 via the scenario edit screen 200.

The scenario generation device 100 complements, as appropriate, the attack scenario with attack activities that are lacking as the attack scenario from the attack means data 131 stored in the attack means storage unit 130. In FIG. 3, a state complemented with attack means α and attack means β is illustrated. The attack means such as the attack means α and the attack means β for complementation are displayed in a format visually distinguishable from the attack means originally arranged on the scenario edit screen 200, such as the attack means X and the attack means Y.

Figure 4:
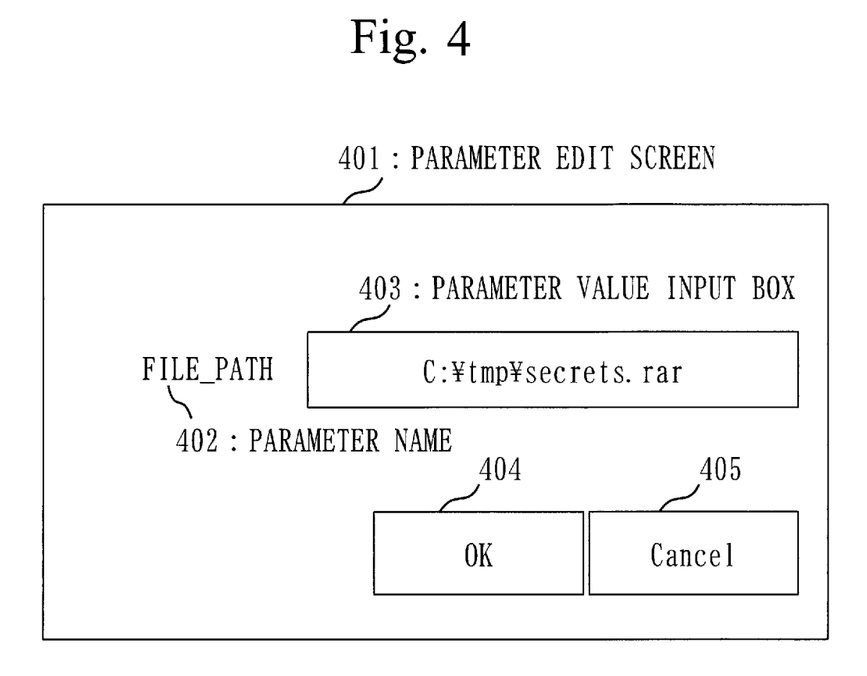
FIG. 4 is a diagram of a parameter edit screen according to Embodiment 1.

FIG. 4 is a diagram of a parameter edit screen 401 according to the present embodiment where parameters of the attack means arranged on the arrangement part 202 are edited.

The edit screen display unit 110 causes the parameter edit screen 401 to be displayed to specify a parameter value for the parameter of the attack means arranged on the scenario edit screen 200. Specifically, the parameter edit screen 401 is displayed by selecting one attack means on the arrangement part 202 and performing operation such as double-clicking. On the parameter edit screen 401, for a parameter that can be specified in the selected attack means, a parameter name 402 and a parameter value input box 403 are displayed as a list. While only one parameter is displayed in FIG. 4, a plurality of parameters are displayed for attack means for which a plurality of parameters can be specified. In the parameter value input box 403, a value currently set as a parameter of the attack means is displayed. The operator 30 changes this value as required, changing the parameter value by pressing an OK button 404 or a cancel button 405 down.

Figure 5:
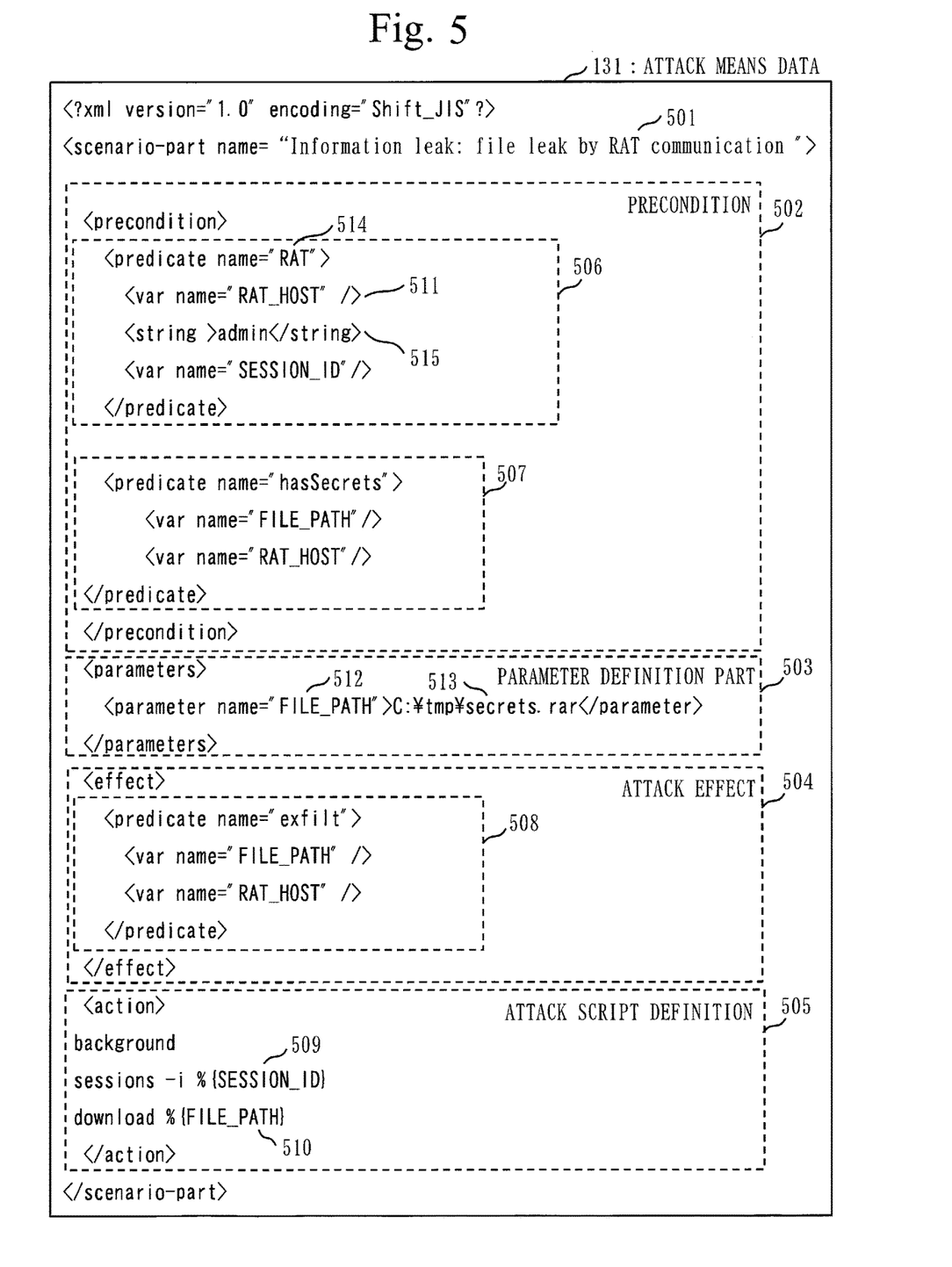
FIG. 5 is a diagram illustrating the structure of attack means data according to Embodiment 1.

FIG. 5 is a diagram illustrating the structure of the attack means data 131 according to the present embodiment, In the present embodiment, the attack means data 131 is saved in the attack means storage unit 130 as a file in an XML (Extensible Markup Language) format. However, this format is not meant to be restrictive, and the attack means data 131 may be described in another format.

The attack means data 131 includes a precondition 502 and an attack effect 504 of attack means. Also, the attack means data 131 includes an attack script definition 505 which defines an attack script to be executed in an attack tool.

Specific description is as follows.

The attack means data 131 has an attack means name 501, the precondition 502, a parameter definition part 503, the attack effect 504, and the attack script definition 505. The attack means name 501 is the name of attack means displayed on the scenario edit screen 200.

The precondition 502 is a condition definition representing, as a predicate, zero or more conditions that have to be satisfied in advance when the attack means is executed. The precondition 502 is also referred to as a precondition definition.

The parameter definition part 503 includes a parameter for use by the attack means and a default value of the parameter. Specifically, the parameter definition part 503 defines a parameter name 512 of the parameter adjustable by the attack means and a default value 513 when unspecified. The attack scenario generation unit 20 sets a parameter value specified from the parameter edit screen 401 as a parameter and also sets a default value for a parameter not specified from the parameter edit screen 401.

The attack effect 504 is definition of an attack effect which represents, with a predicate, one or more effects acquired by executing the attack means. The attack effect 504 is also referred to as an attack effect definition.

The attack script definition 505 defines a script to be inputted to an attack tool such as Metasploit when the attack means is executed. The attack script definition 505 is also referred to as an attack activity definition.

The predicate is represented as a predicate element as indicated by 506, 507, or 508. The predicate element has a name attribute 514 representing a predicate name, and includes, as a child element, a var element (for example, 511) representing an argument of the predicate or a string element (for example, 515). The var element indicates a variable of the predicate, and the string element indicates a constant value.

For example, the predicate 506 in the precondition 502 indicates that one of preconditions is that a predicate RAT (RAT_HOST, "admin", SESSION_ID) holds when a first-order predicate logic notation is used. Since RAT_HOST and SESSION_ID are variables, any value can be taken. Thus, if a predicate RAT ("PC1", "admin", "12345") holds, the precondition RAT (RAT_HOST, "admin", SESSION_ID) taken above as an example is assumed to hold. And, here, "PC1" is substituted into the variable RAT_HOST and "12345" is substituted into SESSION_ID.

Similarly, the predicate 508 in the attack effect 504 indicates that the predicate 508 holds by execution of the present attack means.

Also, the attack script definition 505 can describe a placeholder for storing a variable included in the attack means data 131. Specifically, the attack script definition 505 is capable of defining placeholders 509 and 510 in %{variable name} form. This portion is replaced by a value associated with the variable in the attack means when the attack script is outputted.

Figure 6:
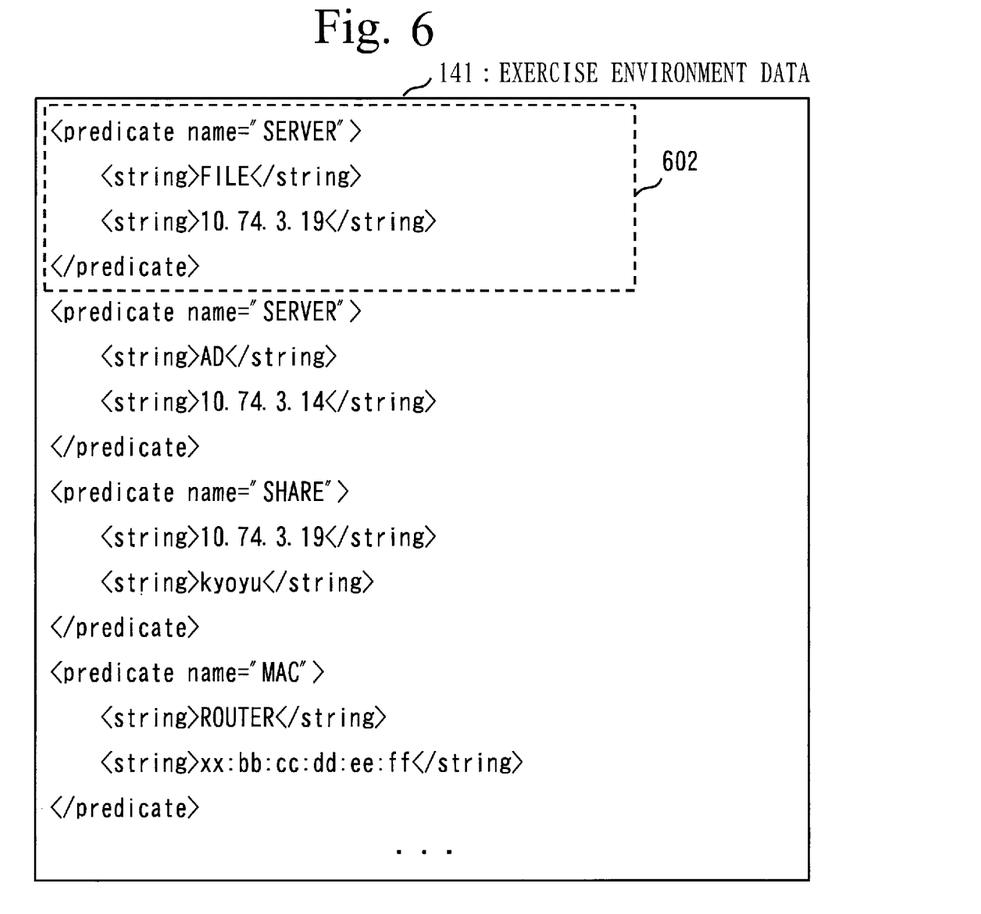
FIG. 6 is a diagram illustrating the structure of exercise environment data according to Embodiment 1.

FIG. 6 is a diagram illustrating the structure of exercise environment data 141 according to the present embodiment.

In the present embodiment, the exercise environment data 141 is saved as a file of an XML format in the exercise environment storage unit 140. However, this format is not meant to be restrictive, and the exercise environment data 141 may be described in another format.

The exercise environment data 141 is configured of zero or more predicates 602 representing the structure of an exercise environment. Specifically, a predicate 602 represents a predicate SERVER ("FILE", "10.74.3.19") when a first-order predicate logic notation is used. This predicate indicates that the IP address of the file server is 10.74.3.19.

Figure 7:
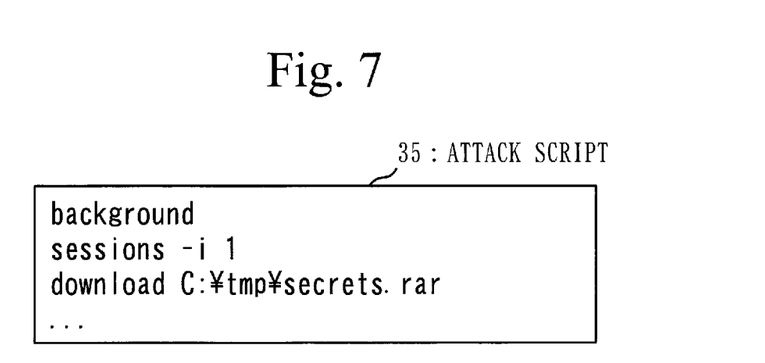
FIG. 7 is a diagram illustrating a format of an attack script according to Embodiment 1.

FIG. 7 is a diagram illustrating a format of an attack script 35 according to the present embodiment.

The attack script 35 in FIG. 7 is the attack script 35 for operating an attack tool such as Metasploit. For the attack script definition 505 of each attack means included in the generated attack scenario 32, the attack script 35 replaces a placeholder by a corresponding variable value, and then concatenates the resultant values along a time series. The format of the attack script 33 can be freely changed in accordance with the attack tool for use.

*Description of Operation*

Next, operation is described.

Figure 8:
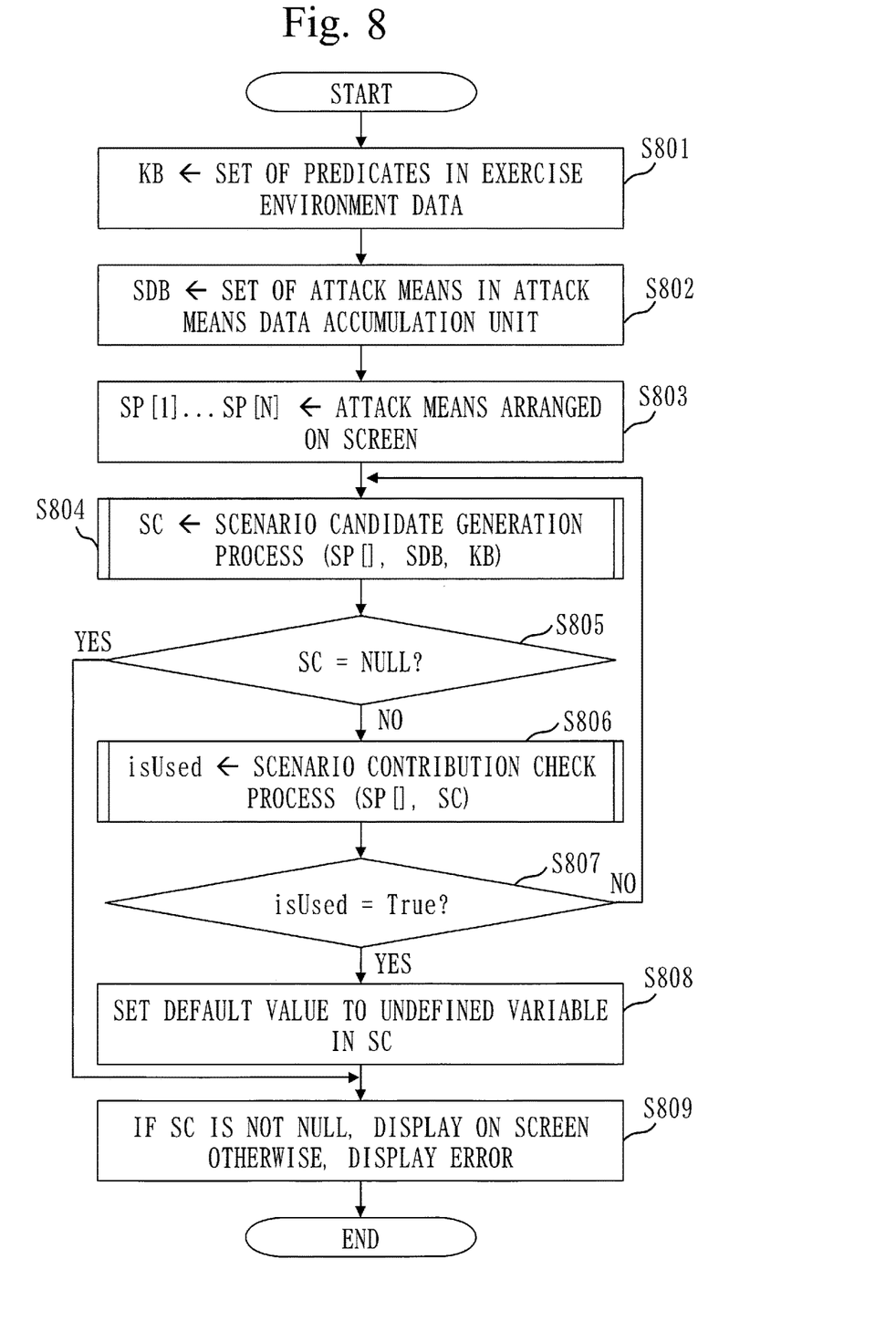
FIG. 8 is a flowchart illustrating operation of an attack scenario generation unit according to Embodiment 1.

FIG. 8 is a flowchart illustrating operation of the attack scenario generation unit 20 according to the present embodiment. Note that variables for use in a flowchart below are assumed to be local variables that are effective only in that flowchart unless specified otherwise. That is, even if the same variable name is used for variables among different flowcharts, these variables are assumed to be independent.

The attack scenario generation unit 20 starts when the scenario generation instruction 31 is inputted from the operator 30 via the scenario edit screen 200 to the scenario generation device 100.

The attack scenario generation unit 20 generates, from previous attack means in a time series, a sub-scenario including attack means having an attack effect matching the precondition of the attack means. Then, by taking the attack effect in the generated sub-scenario as a precondition, the attack scenario generation unit 20 generates a sub-scenario for the next attack means in a time series. The attack scenario generation unit 20 couples a plurality of thus-generated sub-scenarios, thereby generating the attack scenario 32.

<Attack Scenario Generation Process>

At step S801, the attack generation unit 120 loads a set of predicates stored in the exercise environment data 141 stored in the exercise environment storage unit 140 and stores them in variables KB.

At step S802, the attack generation unit 120 stores a set of attack means data 131 stored in the attack means storage unit 130 in variables SDB.

At step S803, the attack generation unit 120 substitutes the attack means data 131 arranged on the scenario edit screen 200 into an array SP[1], SP[2], SP[N] in the order in which a previous one in a time series comes first. The attack means data 131 substituted into SP[1] to SP[N] partially or entirely have their parameter values specified by the operator 30 via the parameter edit screen 401.

At step S804, the attack generation unit 120 calls a scenario candidate generation process by taking the array SP, SDB, and KB as arguments. The scenario candidate generation process will be described further below. The scenario candidate generation process returns an attack scenario candidate. The attack generation unit 120 substitutes the attack scenario candidate into the variables SC.

At step S805, the attack generation unit 120 determines whether scenario candidate generation has been successful. If scenario candidate generation has failed, that is, if an attack scenario satisfying the condition has not been generated, the scenario candidate generation process returns null data. When null data is returned, the process branches to step S809. If scenario candidate generation has been successful, that is, if an attack scenario satisfying the condition has been generated, SC is not null. When SC is not null, the process proceeds to step S806.

At step S806, the attack generation unit 120 calls a scenario contribution check process by taking the array SP and SC as augments. The scenario contribution check process checks whether the attack means specified by the operator 30, that is, the attack means stored in SP, is effectively used by the scenario candidate stored in SC. If it is effectively used, the scenario contribution check process returns true, that is, True. If it is not effectively used, the scenario contribution check process returns false, that is, False. The result is stored in a variable isUsed.

At step S807, if isUsed is not True, the process returns to step S804 to search for another scenario candidate including SP. If isUsed is True, the process proceeds to step S808.

At step S808, the attack generation unit 120 substitutes a default value defined in advance by the attack means into each variable having an indefinite value in each attack means configuring the scenario candidate SC. Since the variable of each attack means of the scenario candidate SC is limited to have the same value as the variable of another attack means, if a variable of one attack means is set at a default value, the value of an indefinite variable of another attack means may be automatically determined at that value. In this case, default value setting for that variable is not performed. The attack generation unit 120 takes the scenario candidate SC with the default value set therein as the attack scenario 32.

Lastly, at step S809, the attack generation unit 120 outputs the generated attack scenario 32 to the edit screen display unit 110. Then, the edit screen display unit 110 causes the generated attack scenario 32 to be displayed on the scenario edit screen 200, and ends the process.

When the attack scenario 32 is generated by the attack scenario generation unit 20, the edit screen display unit 110 causes the attack scenario 32 to be displayed on the scenario edit screen 200, with the attack means arranged on the scenario edit screen 200 and the other attack means arranged in a time series. That is, as illustrated in a lower part of FIG. 3, the edit screen display unit 110 arranges the attack means X and Y initially arranged by the operator 30 and the other extracted attack means α and β in a time series in accordance with the attack scenario 32. The edit screen display unit 110 causes the attack means X and Y arranged on the scenario edit screen 200 and the other attack means α and β for complementation by the attack scenario generation unit 20 to be displayed as being visually distinguished from one another.

Also, the attack scenario generation unit 20 couples the attack script 35 generated by the attack script definition 505 of the attack means data 131 arranged in a time series in the attack scenario 32. By coupling the attack script 35, the attack scenario generation unit 20 generates the script 33 for executing the attack scenario 32 on the attack tool.

Also, if SC is null data at step S805, at step S809, the edit screen display unit 110 causes the effect that attack scenario generation has failed to be displayed on the scenario edit screen 200, and ends the process.

<Scenario Candidate Generation Process>

Figure 9:
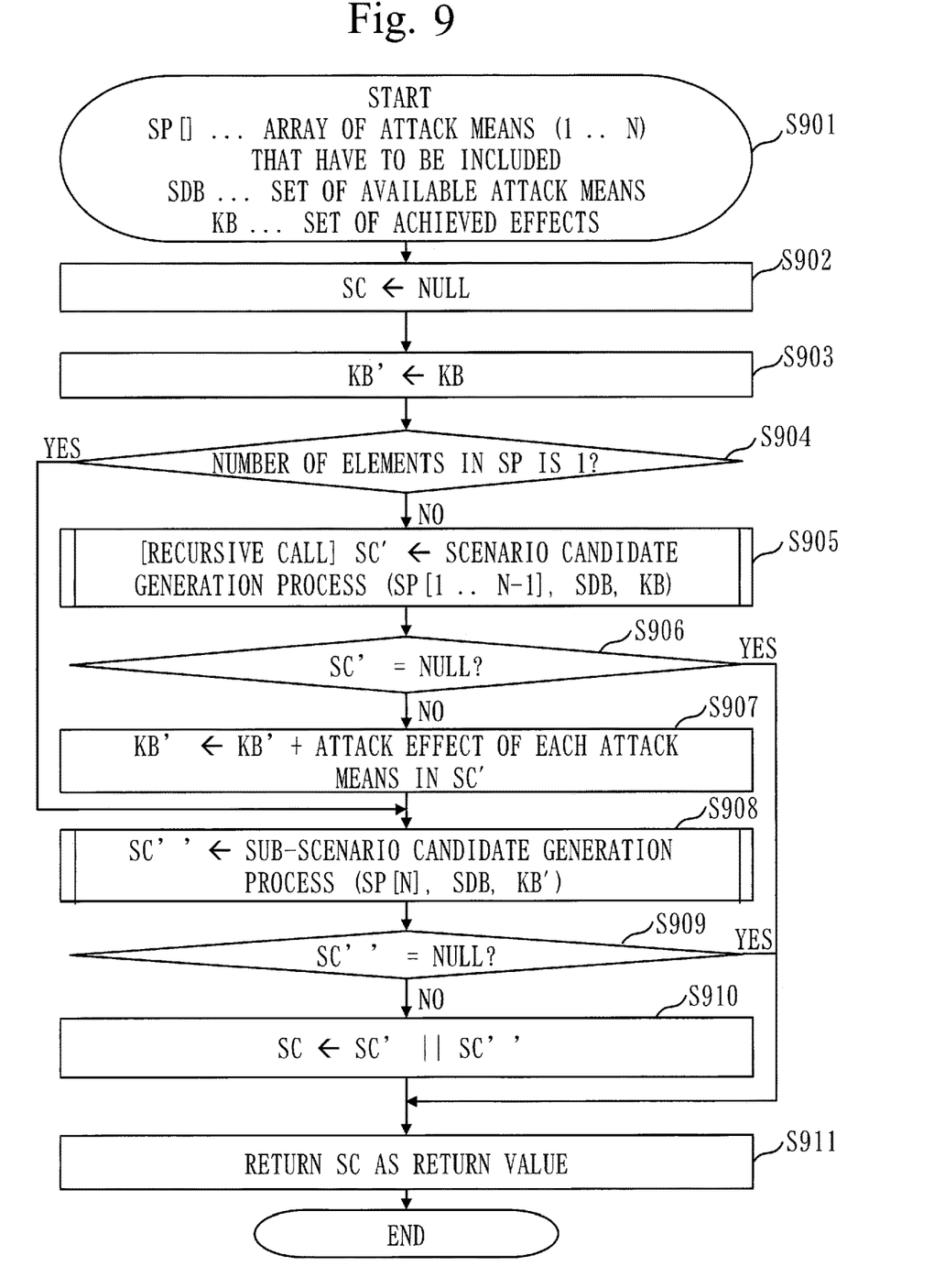
FIG. 9 is a flowchart illustrating a scenario candidate generation process according to Embodiment 1.

FIG. 9 is a flowchart illustrating the scenario candidate generation process according to the present embodiment, that is, step S804 in FIG. 8.

At step S901, parameters when the scenario candidate generation process is called are substituted into the array SP, SDB, and KB. SP is an array of attack means (1, . . . , N) that have to be included in the attack scenario. SDB is a set of available attack means. KB is a set of achieved effects.

At step S902, the scenario candidate generation unit 121 initializes the variable SC where a scenario candidate is to be stored to null data.

At step S903, the scenario candidate generation unit 121 copies the contents of KB to a variable KB' for initialization.

At step S904, the scenario candidate generation unit 121 determines whether the number of elements in the array SP is 1. When the number of elements in the array SP is 1, the process proceeds to step S908. When the number of elements in the array SP is other than 1, the process proceeds to step S905.

At step S905, the scenario candidate generation unit 121 recursively calls the scenario candidate generation process. The scenario candidate generation unit 121 generates a scenario candidate including SP[1] to SP[N−1] and excluding the last attack means and stores the result in the variable SC'.

At step S906, the scenario candidate generation unit 121 determines whether SC' is null. Depending on whether SC' is null, the scenario candidate generation unit 121 checks whether scenario candidate generation at step S905 has been successful. When SC' is null, this means that scenario candidate generation has failed, and therefore SC (null data) is returned at step S911, and the process ends. When SC' is not null, the process proceeds to step S907.

At step S907, the scenario candidate generation unit 121 adds the attack effect included in the attack means of each attack activity in SC' to KB'.

At step S908, the scenario candidate generation unit 121 calls a sub-scenario generation process and generates a sub-scenario which takes execution of SP[N] as a goal. The sub-scenario generation process is a process of generating an attack scenario which takes execution of the given attack means as a goal under the precondition given by KB'. A specific process will be described further below. With this, it is possible to find a sub-scenario additionally required to further execute SP[N] after SC' is executed. The generated sub-scenario is stored in a variable SC". If sub-scenario generation has failed, the variable SC" is null data.

At step S909, the scenario candidate generation unit 121 determines whether sub-scenario generation has been successful. If it has failed, the process branches to step S911, returning null data to the calling source and ending the process. If it has been successful, the process proceeds to step S910.

At step S910, the scenario candidate generation unit 121 substitutes the result of concatenating SC" with SC' into SC. Here, SC is a scenario including all of SP[1] to SP[N].

At step S911, the scenario candidate generation unit 121 returns SC as the process result to the calling source, and the process ends.

<Sub-Scenario Generation Process>

Figure 10:
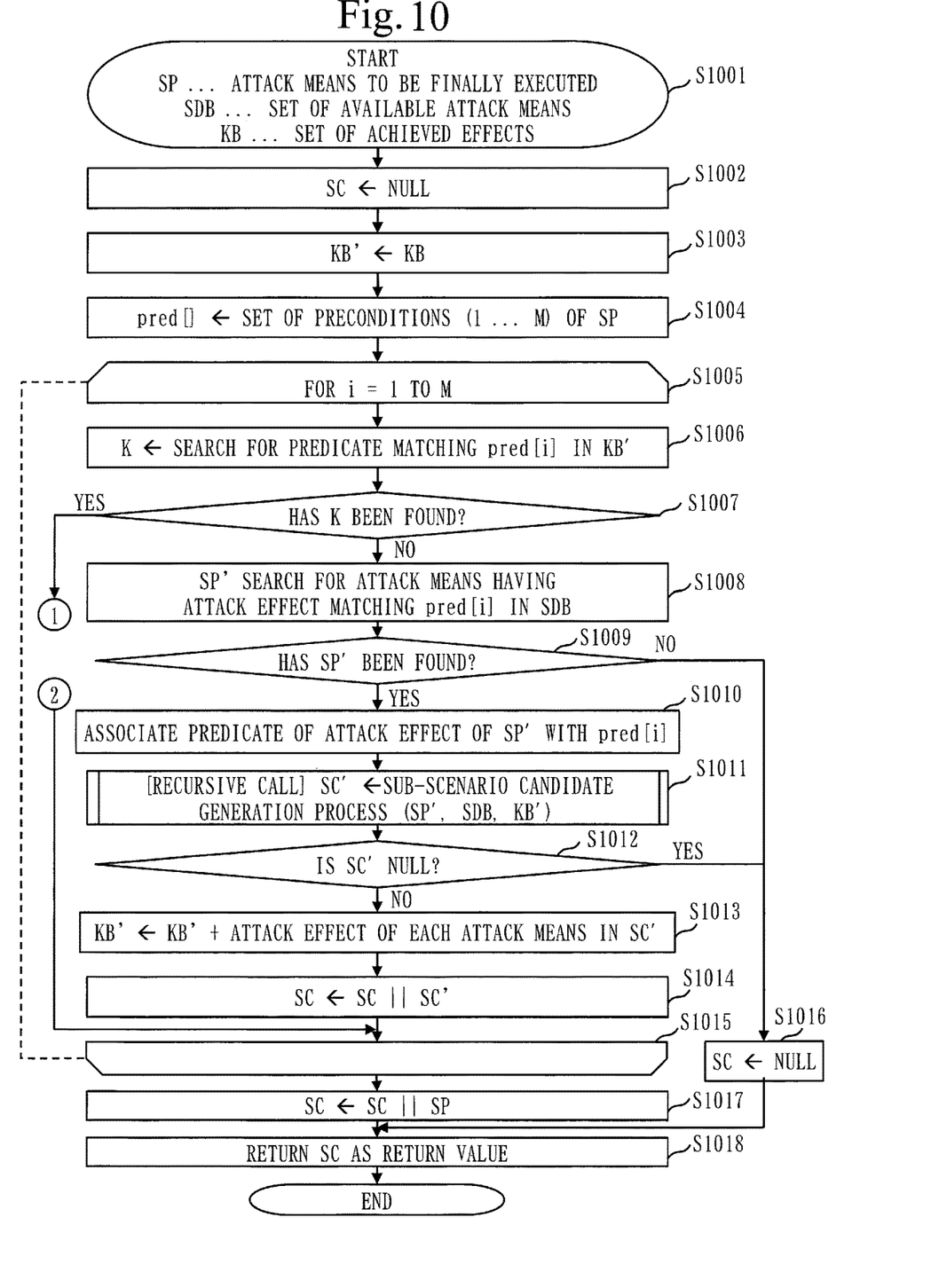
FIG. 10 is a flowchart illustrating a sub-scenario generation process according to Embodiment 1.
Figure 11:
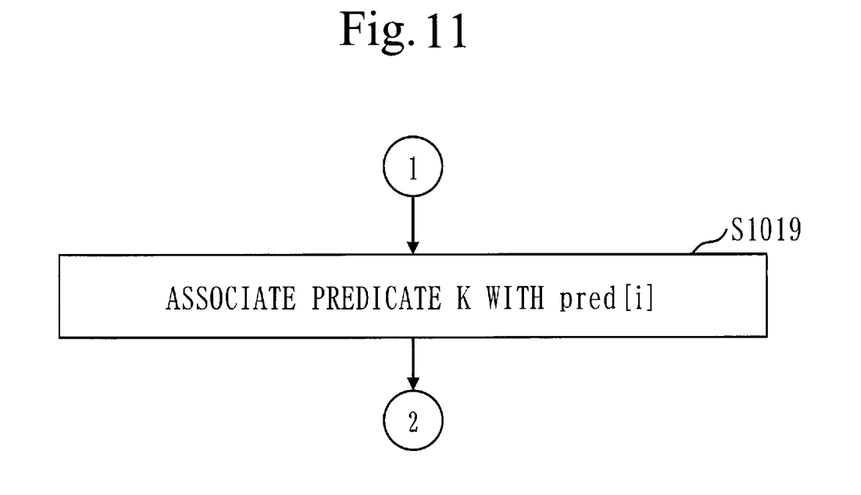
FIG. 11 is a flowchart illustrating the sub-scenario generation process according to Embodiment 1.

FIG. 10 and FIG. 11 are flowcharts illustrating the sub-scenario generation process according to the present embodiment, that is, step S908 in FIG. 9.

At step S1001, parameters when the sub-scenario generation process is called are substituted into SP, SDB, and KB. SP is attack means to be finally executed. SDB is a set of available attack means. KB is a set of achieved effects.

At step S1002, the sub-scenario generation unit 123 initializes the variable SC where a generated sub-scenario is to be stored to null data.

At step S1003, the sub-scenario generation unit 123 copies the contents of KB to the variable KB' for initialization.

At step S1004, the sub-scenario generation unit 123 stores the set of preconditions of the attack means SP in an array pred. Simultaneously, the number of elements in the array is stored in a variable M.

Step S1005 to step S1015 form a loop, and a counter variable i of the loop is incremented in a range from 1 to M.

At step S1006, the sub-scenario generation unit 123 searches for a predicate matching pred[i] in KB', and stores the matching predicate in a variable K. At step S1007, if a predicate matching pred[i] is found, the process branches to step S1019. If a predicate matching pred[i] is not found, the process proceeds to step S1008.

At step S1019, the predicate K is associated with pred[i]. Association is a process of storing that predicates are referred to each other and setting so that a variable in one predicate refers to the same entity as the variable or constant at the same position in the other predicate.

At step S1008, the sub-scenario generation unit 123 searches for attack means having an attack effect matching pred[i] in the set SDB of attack means, and stores the result in a variable SP'.

At step S1009, if matching attack means is not found at step S1008, this means that sub-scenario generation has failed, and therefore the process branches to step S1016. At step S1016, the sub-scenario generation unit 123 substitutes null data into a return value SC to indicate that sub-scenario generation has failed, returns SC to a calling source at step S1018, and ends the process. At step S1009, if matching attack means is found at step S1008, that is, if searching for attack means has been successful, the process proceeds to step S1010.

At step S1010, the sub-scenario generation unit 123 associates the predicate of the attack effect of SP' with pred[i].

At step S1011, the sub-scenario generation unit 123 finds a sub-scenario which takes attack means SP' found at step S1008 as a goal, and stores the result in SC'. By recursively calling the sub-scenario generation process, the sub-scenario generation unit 123 finds a sub-scenario which takes the attack means SP' found at step S1008 as a goal.

If sub-scenario generation has failed at step S1011, the process branches at step S1012 to step S1016, substituting null data into the return value SC and returning SC to a calling source at step S1018, and the process ends. If sub-scenario generation has been successful at step S1011, the process proceeds to step S1013.

At step S1013, the sub-scenario generation unit 123 adds the predicate in the attack effect of each attack means included in the sub-scenario SC' to KB'.

At step S1014, the sub-scenario generation unit 123 concatenates the generated sub-scenario SC' at the back of the sub-scenario SC generated so far.

Step S1015 is the end of the loop, and the process returns to step S1005 to start the next loop. When the loop ends, a sub-scenario for satisfying all of the preconditions pred[ ] of SP is stored in SC.

At step S1017, the sub-scenario generation unit 123 adds SP to the end of SC. This process causes SC to become a sub-scenario which takes SP as a goal.

At step S1018, the sub-scenario generation unit 123 takes SC as a return value and returns the result to a calling source, and the process ends.

Lastly, the scenario contribution check process indicated at step S806 in FIG. 8 is described.

In the scenario contribution check process, the scenario contribution check unit 122 checks that the attack effect of the attack means arranged on the scenario edit screen 200 is used as a precondition of any attack means included in the attack scenario 32. Specifically, the scenario contribution check unit 122 checks that at least one of the predicates of the attack effect definitions of the attack means of SP[ ] included in SC, except the end, is associated with a predicate included in the precondition in another attack means. Here, the end is SP[N] illustrated in FIG. 8. Unless this scenario contribution check process is performed, there is a possibility of presenting, as a complementation result, a scenario in which part of the attack means arranged by the operator 30 is not contributing to a success of attack. The attack means not contributing a success of attack is a useless attack activity which does not have to be required in the scenario. Thus, the scenario including such an attack activity is never be performed at all by a rational attacker. The scenario contribution check process is a process for preventing such a scenario from being presented to the operator 30.

*Other Structures*

Modification Example 1

In the present embodiment, the functions of the edit screen display unit 110 and the attack scenario generation unit 20 are implemented by software. As a modification example, the functions of the edit screen display unit 110 and the attack scenario generation unit 20 may be implemented by hardware.

Specifically, the scenario generation device 100 includes an electronic circuit in place of the processor 910.

The electronic circuit is a dedicated electronic circuit which implements the functions of the edit screen display unit 110 and the attack scenario generation unit 20.

The electronic circuit is, specifically, a single circuit, composite circuit, programmed processor, parallel-programmed processor, logic IC, GA, ASIC, or FPGA. GA is an abbreviation of Gate Array. ASIC is an abbreviation of Application Specific Integrated Circuit. FPGA is an abbreviation of Field-Programmable Gate Array.

The functions of the edit screen display unit 110 and the attack scenario generation unit 20 may be implemented by a single electronic circuit or may be implemented as being distributed into a plurality of electronic circuits.

As another modification example, part of the functions of the edit screen display unit 110 and the attack scenario generation unit 20 may be implemented by an electronic circuit and the remaining functions may be implemented by software. Also, part or all of the functions of the edit screen display unit 110 and the attack scenario generation unit 20 may be implemented by firmware.

Each of the processor and the electronic circuit is also referred to as processing circuitry. That is, in the scenario generation device 100, the functions of the edit screen display unit 110 and the attack scenario generation unit 20 are implemented by processing circuitry.

*Description of Effects of Present Embodiment*

In the scenario generation device 100 according to the present embodiment, a sub-scenario is generated in the order of the attack means arranged by the operator on the screen in which an earlier one in a time series comes first. With the attack effect in the sub-scenario taken into consideration for the exercise environment data, the next sub-scenario is generated. Then, in the scenario generation device 100 according to the present embodiment, these are coupled, and thus there is an effect in which an attack scenario including all specified attack means can be generated.

In the scenario generation device 100 according to the present embodiment, only by the operator such as a teacher arranging attack means desired to be included in an attack scenario, an attack scenario including all these attack means and achieving meaningful attack activities can be automatically generated. Thus, according to the scenario generation device 100 of the present embodiment, an attack scenario can be generated irrespective of teacher's knowledge about cyber attacks, and a time for manually generating an attack scenario can be eliminated.

Also, in the scenario generation device 100 according to the present embodiment, it is checked whether the attack effect of the attack means arranged by the operator contributes as a precondition of another attack means in the generated attack scenario. Thus, according to the scenario generation device 100 of the present embodiment, there is an effect in which an irrational attack scenario can be excluded.

Also, in the scenario generation device 100 according to the present embodiment, a settable parameter and its default value are defined for each attack means. Thus, according to the scenario generation device 100 of the present embodiment, there is an effect in which the operator can finely control the behavior of the attack means arranged on the screen as required and setting of an uninteresting parameter can be omitted.

Also, in the scenario generation device 100 according to the present embodiment, for each attack means, an attack script for executing that attack means by the attack execution tool is defined as an attack activity definition. And, in the scenario generation device 100 according to the present embodiment, from each attack means in the generated attack scenario, the attack activity definitions are concatenated in the order in which an earlier one in a time series comes first. Thus, there is an effect in which an attack script can be automatically generated.

Furthermore, in the scenario generation device 100 according to the present embodiment, a placeholder to be replaced by a parameter of the precondition definition and the attack effect definition is prepared in the attack activity definition. Thus, according to the scenario generation device 100 of the present embodiment, there is an effect in which a variable value such as a host name in the generated attack scenario can be automatically reflected onto the attack script.

Still further, in the scenario generation device 100 according to the present embodiment, with an attack means name defined to the attack means, a list of attack means in the attack means storage unit can be displayed on the list part on the scenario edit screen, that is, the attack means list display pane. Thus, according to the scenario generation device 100 of the present embodiment, there is an effect in which a list of attack means available for the operator can be visually grasped.

Yet further, in the scenario generation device 100 according to the present embodiment, when the operator as a teacher selects attack means serving as an exercise point from the list part, arranges it on the arrangement part, and then generates an attack scenario, the generated attack scenario is displayed on the screen. Here, in the scenario generation device 100 according to the present embodiment, the attack means for complementation is rendered so as to be visually distinguishable from the arranged attack means. Thus, according to the scenario generation device 100 of the present embodiment, there is an effect in which the operator can easily determine whether the generated scenario is a desired one.

In the above-described Embodiment 1, each unit of the scenario generation device is described as an independent functional block. However, the structure of the scenario generation device is not the one as described in the above-described embodiment. The functional block of the scenario generation device may have any structure which can implement the function described in the above-described embodiment. Also, the scenario generation device may not be a single device but may be a system configured of a plurality of devices.

Also, a plurality of portions in Embodiment 1 may be combined for implementation. Alternatively, in this embodiment, a single portion may be implemented. In addition, this embodiment may be implemented by any combination, entirely or partially.

That is, in Embodiment 1, embodiments can be freely combined, any component can be modified in each embodiment, or any component can be omitted in each embodiment.

Note that the above-described embodiment is an essentially preferable example, and is not intended to restrict the scope of the present invention, the scope of subjects to which the present invention is applied, and the scope of use of the present invention. The above-described embodiment can be variously changed as required.

REFERENCE SIGNS LIST

20: attack scenario generation unit; 30: operator; 31: scenario generation instruction; 32: attack scenario; 33: script; 35: attack script; 100: scenario generation device; 110: edit screen display unit; 120: attack generation unit; 121: scenario candidate generation unit; 122: scenario contribution check unit; 123: sub-scenario generation unit; 130: attack means storage unit; 131: attack means data; 140: exercise environment storage unit; 141: exercise environment data; 200: scenario edit screen; 202: arrangement part; 203: list part; 204: name; 208: black circle; 401: parameter edit screen; 402: parameter name; 403: parameter value input box; 404: OK button; 405: cancel button; 501: attack means name; 502: precondition; 503: parameter definition part; 504: attack effect; 505: attack script definition; 512: parameter name; 513: default value; 514: name attribute; 509, 510: placeholder; 506, 507, 508, 602: predicate; 910: processor; 921: memory; 922: auxiliary storage device; 930: input/output interface; 950: communication device

The invention claimed is:

1. A scenario generation device which generates an attack scenario for use in a cyber attack exercise, the scenario generation device comprising:
    a memory to store attack means data indicating attack means with componentized attack activities of a cyber attack, the attack means data including a precondition and an attack effect of the attack means; and
    processing circuitry
    to arrange attack means to be included in the attack scenario on a scenario edit screen, and
    to extract, by using the attack means data stored in the memory, another attack means whose attack effect is a precondition of attack means arranged on the scenario edit screen from the memory and to generate the attack scenario by complementing the attack means arranged on the scenario edit screen, and for which the another attack means has been extracted, with the other attack means.

2. The scenario generation device according to claim 1, wherein
    when the attack scenario is generated by the processing circuitry, the processing circuitry causes the attack scenario to be displayed on the scenario edit screen, with the attack means arranged on the scenario edit screen, and for which the another attack means has been extracted, and the other attack means arranged in a time series.

3. The scenario generation device according to claim 1, wherein
the processing circuitry
arranges a plurality of attack means to be included in the attack scenario in a time series on the scenario edit screen, and
generates the attack scenario by: from previous attack means in a time series, generating a sub-scenario including attack means having an attack effect matching the precondition of the previous attack means; by taking the attack effect in the sub-scenario as a precondition, generating a sub-scenario for next attack means in a time series; and coupling a plurality of generated sub-scenarios.

4. The scenario generation device according to claim 1, wherein
the attack means data includes an attack script definition which defines an attack script to be executed by an attack tool, and
the processing circuitry generates a script to be executed for executing the attack scenario on the attack tool by coupling the attack script generated by an attack script definition of the attack means data arranged in a time series in the attack scenario.

5. The scenario generation device according to claim 4, wherein
the attack script definition is capable of describing placeholders for storing variables included in the attack means data.

6. The scenario generation device according claim 1, wherein
the attack means data includes a parameter definition part including a parameter for use by attack means associated with the attack means data and a default value of the parameter, and
the processing circuitry
causes a parameter edit screen to be displayed to specify a parameter value for the parameter of attack means arranged on the scenario edit screen, and
sets a parameter value specified from the parameter edit screen as a parameter and also sets a default value for a parameter not specified from the parameter edit screen.

7. The scenario generation device according to claim 1, wherein
the processing circuitry causes the attack means arranged on the scenario edit screen, and for which the another attack means has been extracted, and the other attack means for complementation by the processing circuitry to be displayed as being visually distinguished from one another.

8. The scenario generation device according to claim 1, wherein
the processing circuitry checks that the attack effect of the attack means arranged on the scenario edit screen, and for which the another attack means has been extracted, is used as a precondition of any attack means included in the attack scenario.

9. A scenario generation method of a scenario generation device which generates an attack scenario for use in a cyber attack exercise, the scenario generation method comprising:
storing attack means data indicating attack means with componentized attack activities of a cyber attack, the attack means data including a precondition and an attack effect of the attack means;
arranging attack means to be included in the attack scenario on a scenario edit screen; and
extracting, by using the stored attack means data, another attack means whose attack effect is a precondition of attack means arranged on the scenario edit screen and generating the attack scenario by complementing the attack means arranged on the scenario edit screen, and for which the another attack means has been extracted, with the other attack means.

10. A non-transitory computer readable medium having therein a scenario generation program of a scenario generation device which generates an attack scenario for use in a cyber attack exercise, wherein
the scenario generation device includes a memory to store attack means data indicating attack means with componentized attack activities of a cyber attack, the attack means data including a precondition and an attack effect of the attack means, and
the scenario generation program causes the scenario generation device as a computer to execute
an edit screen display process of arranging attack means to be included in the attack scenario on a scenario edit screen, and
an attack scenario generation process of extracting, by using the attack means data stored in the memory, another attack means whose attack effect is a precondition of attack means arranged on the scenario edit screen from the memory and generating the attack scenario by complementing the attack means arranged on the scenario edit screen, and for which the another attack means has been extracted, with the other attack means.

* * * * *